(12) United States Patent
Numatsu

(10) Patent No.: US 11,320,645 B2
(45) Date of Patent: May 3, 2022

(54) INNER SURFACE IMAGE INSPECTION APPARATUS

(71) Applicant: FANUC CORPORATION, Yamanashi (JP)

(72) Inventor: Masatoshi Numatsu, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 100 days.

(21) Appl. No.: 17/064,227

(22) Filed: Oct. 6, 2020

(65) Prior Publication Data
US 2021/0157121 A1 May 27, 2021

(30) Foreign Application Priority Data

Nov. 27, 2019 (JP) .............................. JP2019-214523

(51) Int. Cl.
*G02B 27/14* (2006.01)
*G02B 23/24* (2006.01)
*G01C 3/08* (2006.01)
*G02B 7/182* (2021.01)

(52) U.S. Cl.
CPC ........... *G02B 23/2423* (2013.01); *G01C 3/08* (2013.01); *G02B 7/182* (2013.01); *G02B 23/2446* (2013.01); *G02B 23/2461* (2013.01); *G02B 23/2484* (2013.01); *G02B 27/14* (2013.01)

(58) Field of Classification Search
CPC ................ G02B 23/2423; G02B 7/182; G02B 23/2446; G02B 23/2461; G02B 23/2484; G02B 27/14; G01C 3/08
USPC .......................................................... 359/629
See application file for complete search history.

(56) References Cited

U.S. PATENT DOCUMENTS 5,640,270 A * 6/1997 Aziz .................. G02B 23/2423
250/201.3

* cited by examiner

*Primary Examiner* — William Choi
(74) *Attorney, Agent, or Firm* — Nakanishi IP Associates, LLC

(57) ABSTRACT

An inner surface image inspection apparatus includes: an image-capturing unit; a lens-barrel attached in front of the image-capturing unit, the lens-barrel containing lenses; an insert unit of a cylindrical shape attached to a leading end of the lens-barrel, the insert unit adapted to be inserted into the hole of the inspection object; a mirror disposed in the insert unit in such a manner that a reflecting surface of the mirror is inclined relative to the optical axis of the lenses of the optical system; and a linear motion mechanism configured to move the mirror in parallel to the optical axis.

9 Claims, 5 Drawing Sheets

INNER SURFACE IMAGE INSPECTION APPARATUS

CROSS-REFERENCE TO RELATED APPLICATIONS

This application is based upon and claims the benefit of priority from the Japanese Patent Application No. 2019-214523, filed Nov. 27, 2019 the entire contents of which are incorporated herein by reference.

FIELD

Embodiments described herein relate generally to an inner surface image inspection apparatus.

BACKGROUND

An inner surface image inspection apparatus for inspecting an inner surface of an inspection object, for example, a cylindrical member, includes an image-capturing unit, an optical system, a light source, and a mirror provided on an insert unit that is to be inserted in the cylindrical member during inspection. An illumination light from the light source is reflected on the mirror and illuminates the inner surface of the cylindrical member. The reflected light from the inner surface of the cylindrical member enters the image-capturing unit through the optical system, and an inner surface image is captured. From the inner surface image, it is possible to inspect surface properties of the inner surface of the cylindrical member.

However, any optical system has a distance from an objective lens (or a cover glass thereof) to an object, namely, a working distance (WD), determined as an eigenvalue. Accordingly, it has been necessary to make available more than one type of inner surface image inspection apparatus that has a different working distance WD for each internal diameter of cylindrical members, or to provide an optical system that has a variable working distance WD.

SUMMARY OF INVENTION

Technical Problem

There is a need for an inner surface image inspection apparatus capable of flexibly dealing with various inspection objects that have different internal diameters.

Solution to Problem

An aspect of the disclosure is an inner surface image inspection apparatus for inspecting an inner surface of a hole of an inspection object. The inner surface image inspection apparatus includes: an image-capturing unit; a lens-barrel attached in front of the image-capturing unit, the lens-barrel containing an optical system; a light source unit attachable to and removable from the lens-barrel; a beam splitter that reflects an illumination light from the light source unit in a direction parallel to an optical axis of the optical system; an insert unit of a cylindrical shape attached to a leading end of the lens-barrel, the insert unit adapted to be inserted into the hole of the inspection object; a mirror disposed in the insert unit in such a manner that a reflecting surface of the mirror is inclined relative to the optical axis of the optical system; and a linear motion mechanism configured to move the mirror in parallel to the optical axis.

According to the aspect, it is possible to flexibly deal with inspection of various inspection objects that have different internal diameters.

DETAILED DESCRIPTION

An inner surface image inspection apparatus according to an embodiment will now be described with reference to drawings. The inner surface image inspection apparatus according to the embodiment obtains an image of an inner surface of a bottomed hole or a through hole of an inspection object to inspect surface properties of the inner surface. Here, as such an inspection object, a cylindrical member will be described as an example.

Figure 1:
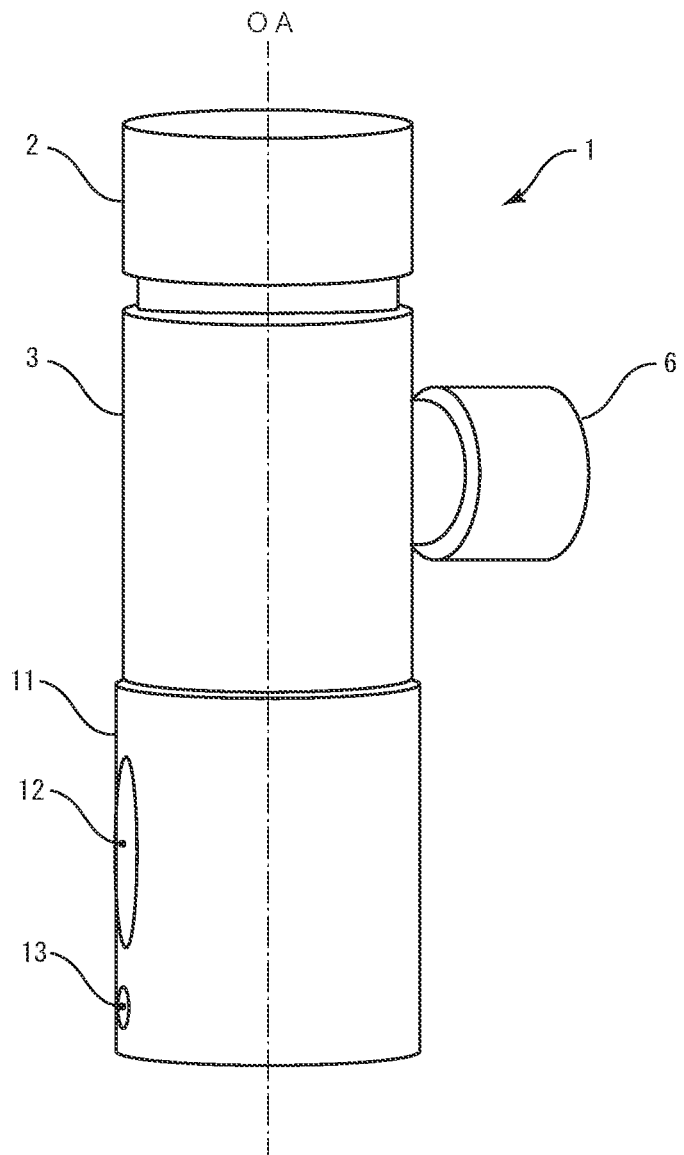
FIG. 1 is an exterior view of an inner surface image inspection apparatus according to an embodiment.
Figure 2:
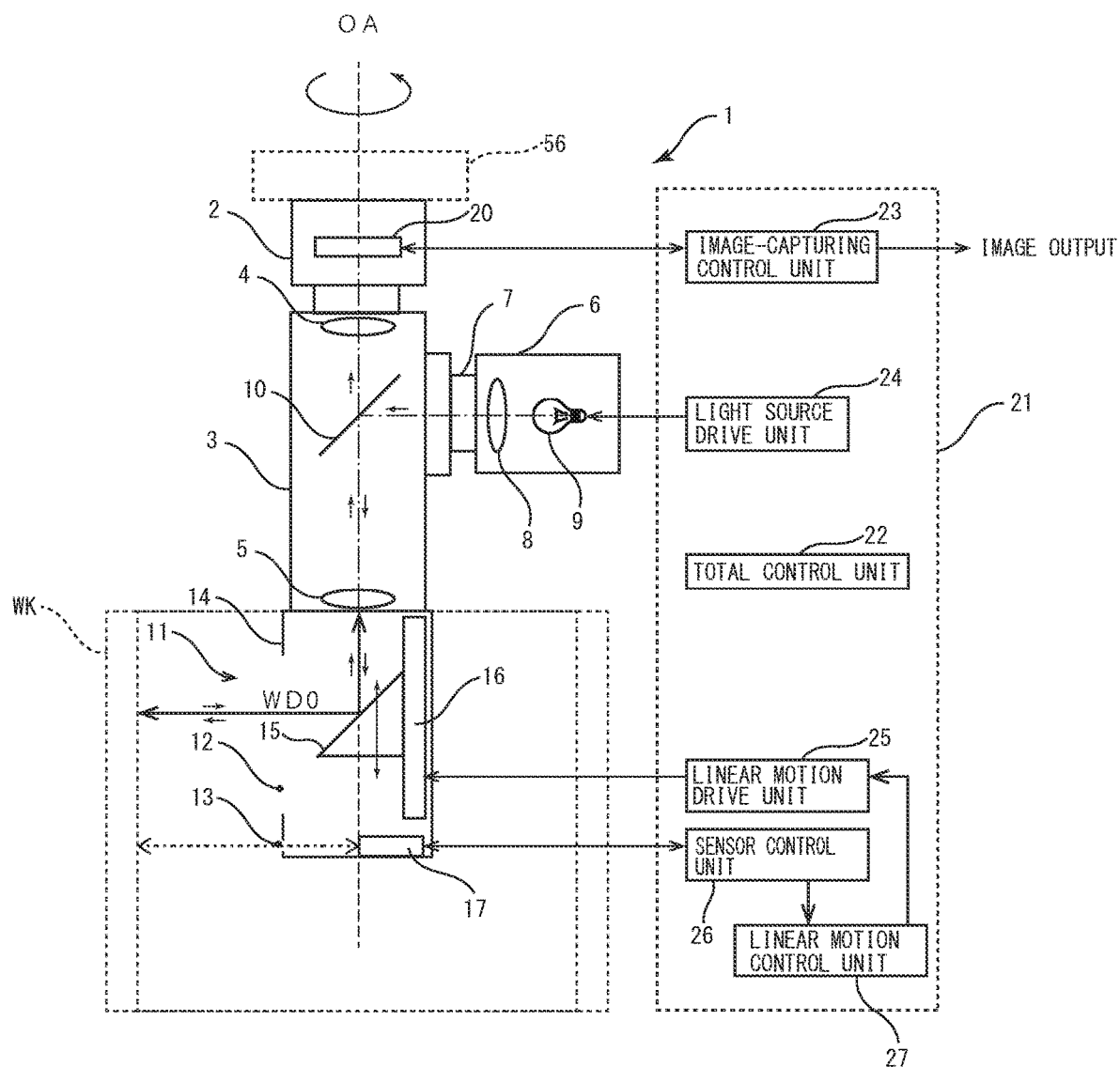
FIG. 2 is a block diagram of the inner surface image inspection apparatus in FIG. 1.

As illustrated in FIG. 1 and FIG. 2, an inner surface image inspection apparatus 1 according to the embodiment includes an image-capturing unit 2 provided with an image sensor 20 such as a CCD. A lens-barrel 3 is attached in front of the image-capturing unit 2. An optical system, preferably a telecentric lens optical system, including lenses 4 and 5 is held within the lens-barrel 3. An opening is provided in a part of a side surface of the lens-barrel 3, and a light source unit 6 provided with a coaxial port 7 is removably provided to the opening. The light source unit 6 includes a telecentric lens 8 and a light source 9 such as an LED spotlight and forms a coaxial epi-illumination unit along with a beam splitter 10 such as a half-silvered mirror disposed at an inclination of 45° relative to an optical axis OA of the optical system. Note that the coaxial epi-illumination unit may be a pseudo-coaxial epi-illumination unit. Further, the coaxial epi-illumination is not a limitation, provided that a surface under inspection within a cylindrical member WK can be uniformly illuminated. To simplify the structure here, description will be made as to a case where a coaxial epi-illumination provided with the coaxial port 7 is applied. An inner surface of the cylindrical member WK is curved and image capturing is repeated over the entire inner surface during the inspection. Accordingly, the telecentric optical system, the angle of view of which is zero or approximately zero, is preferable in that any dimensional variation may not lead to inspection errors.

An insert unit 11 is attached to a leading end of the lens-barrel 3, and is to be inserted into the cylindrical member WK, which is the inspection object, during inspection. The insert unit 11 includes a cylindrical body 14 provided with a circular inspection window 12 and a cutout for sensor light 13 as openings in a side surface of the cylindrical body 14. A mirror 15, such as a right-angle prism mirror, is contained in the cylindrical body 14, a reflecting surface of the mirror 15 being provided at an inclination of 45° relative to the optical axis OA of the optical system.

Note that the mirror 15 may be a planar mirror attached at an inclination of 45° relative to the optical axis OA. An image of the surface under inspection (the inner surface of the cylindrical member WK) can be projected onto an imaging plane of the image sensor 20 by the mirror 15. The illumination light from the light source unit 6 is output from the inspection window 12 through the beam splitter 10 and the mirror 15 in an orientation orthogonal to the optical axis OA, and illuminates the inner surface of the cylindrical member WK. A linear motion mechanism 16 is contained in the cylindrical body 14 along with the mirror 15 and supports the mirror 15 in a linearly movable manner along the optical axis OA. Any configuration such as a ball screw mechanism and a cylindrical cam used in a zoom lens mechanism of a typical camera may be applicable to the linear motion mechanism 16. Although in the description here, it is assumed that the mirror 15 is electrically driven, the mirror 15 may be moved manually.

The working distance WD is defined as a distance on the optical axis OA from the front of the objective lens 5 of the optical system or a cover glass thereof to an imaged surface (the inner surface of the cylindrical member WK) through the mirror 15. For the purpose of illustration here, the working distance WD is defined as a distance on the optical axis OA from the front of the objective lens 5 of the optical system to the inner surface of the cylindrical member WK through the mirror 15. Further, a working distance WD from a leading end of the objective lens 5 to the imaged surface on which the objective lens 5 is focused is referred to as a reference working distance WD0.

The movement of the mirror 15 causes change in the distance on the optical axis OA between the front of the objective lens 5 of the optical system and the reflecting surface of the mirror 15. This also causes change in the distance (working distance WD) on the optical axis OA between the front of the objective lens 5 of the optical system and the inner surface of the cylindrical member WK. By moving the mirror 15 to an appropriate position depending on the internal diameter of the cylindrical member WK, the working distance WD can be matched with the reference working distance WD0. Accordingly, when various cylindrical members WK that have different internal diameters are to be inspected, it is possible to flexibly deal with the situation and eliminate out of focus. In other words, even when the reference working distance WD0 of the optical system is invariable, it is possible to accurately inspect surface properties of various cylindrical members WK that have different internal diameters while eliminating out of focus.

In addition to the mirror 15 and the linear motion mechanism 16, a distance sensor 17 for measuring a distance from the optical axis OA of the optical system to the inner surface of the cylindrical member WK or any distance from which the distance from the optical axis OA of the optical system to the inner surface of the cylindrical member WK is derivable is provided in the insert unit 11. Any type of sensor including a reflective-type optical or ultrasonic sensor may be applicable to the distance sensor 17. Description here will be made, assuming that the distance sensor 17 is a reflective-type optical sensor. Light from the distance sensor 17, for example laser light, is output from the insert unit 11 through the cutout for sensor light 13, reflected on the inner surface of the cylindrical member WK, and received by the distance sensor 17.

A control unit 21 includes: a total control unit 22; an image-capturing control unit 23 configured to control and drive the image sensor 20 and output an image signal; a light source drive unit 24 configured to drive the light source 9; a linear motion drive unit 25 configured to drive the linear motion mechanism 16; a sensor control unit 26 configured to control and drive the distance sensor 17 and calculate a distance to the inner surface of the cylindrical member WK; and a linear motion control unit 27. The linear motion control unit 27 controls the linear motion drive unit 25 to move the mirror 15 to an appropriate position according to the distance to the inner surface of the cylindrical member WK calculated by the sensor control unit 26.

Figure 3:
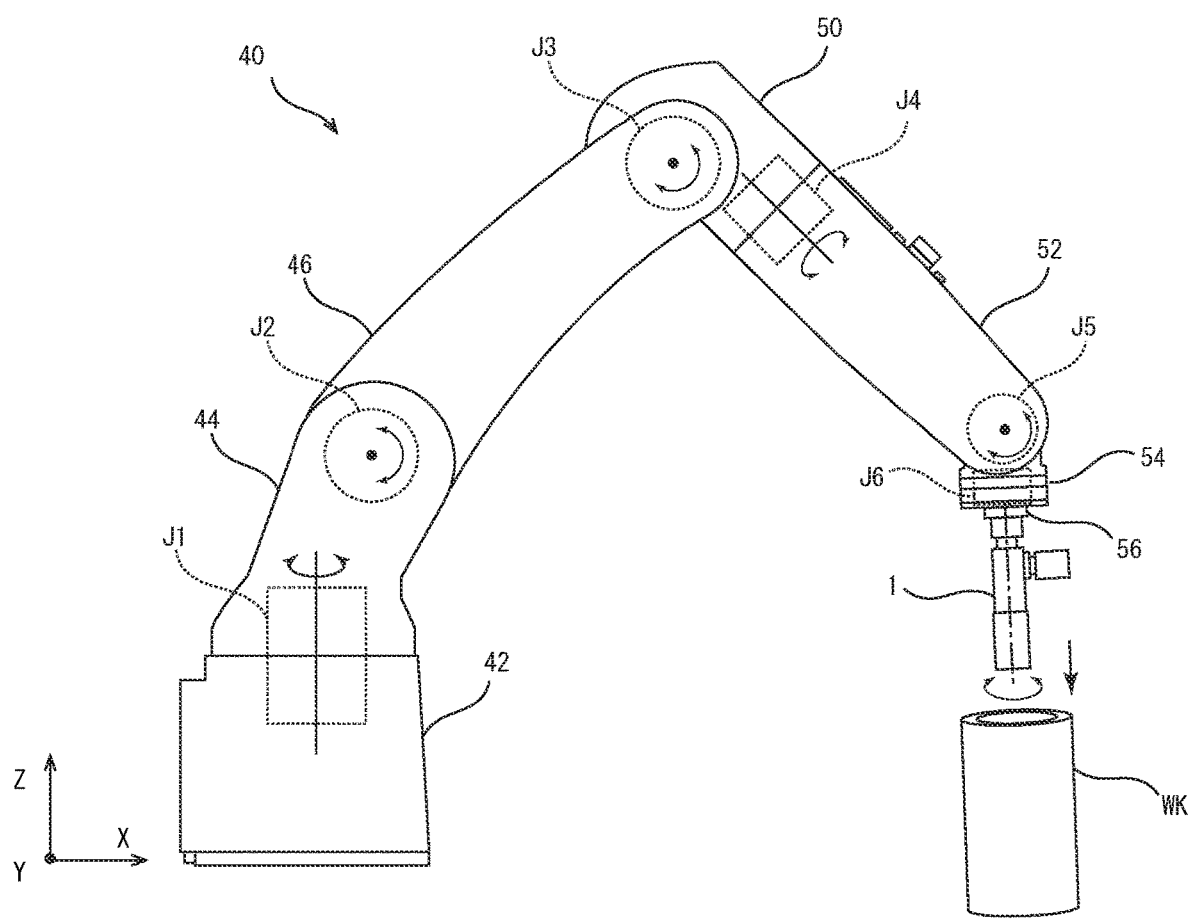
FIG. 3 illustrates an example of use of the inner surface image inspection apparatus in FIG. 1 attached to a robot apparatus.

As illustrated in FIG. 3, the inner surface image inspection apparatus 1 is typically attached to an arm leading end of an articulated robot apparatus 40 when it is used to inspect the cylindrical member WK. As a matter of course, any other scheme may be adopted, including moving the cylindrical member WK by the articulated robot apparatus 40 or the like to an inspection position while the inner surface image inspection apparatus 1 is fixed to an inspection table. Here, the former will be described as an example.

A link 44 is mounted on a base 42 via a swiveling revolute joint unit J1. A link 46 is connected to the link 44 by a revolute joint unit J2 for pivoting back and forth. A link 50 is connected to the link 46 by a revolute joint unit J3 for pivoting up and down. A link 52 is connected to the link 50 by a twisting revolute joint unit J4. A mount 54 is connected to the link 52 by a revolute joint unit J5 for wrist bending and pivoting. A mount plate 56 is provided on the mount 54 for attaching an inner surface image inspection apparatus 1 as an end effector. The mount plate 56 is rotatably provided by a revolute joint unit J6. The inner surface image inspection apparatus 1 is attached to the mount plate 56 in such a manner that the optical axis OA coincides with a center line of rotation of the revolute joint unit J6. During inner surface image inspection, the articulated robot apparatus 40 is actuated, so that the inner surface image inspection apparatus 1 is inserted into the cylindrical member WK disposed at an inspection position, and ideally rotated around the optical axis OA. In synchronization with the rotation, images of the inner surface of the cylindrical member WK are repeatedly captured by the image sensor 20.

Figure 4A:
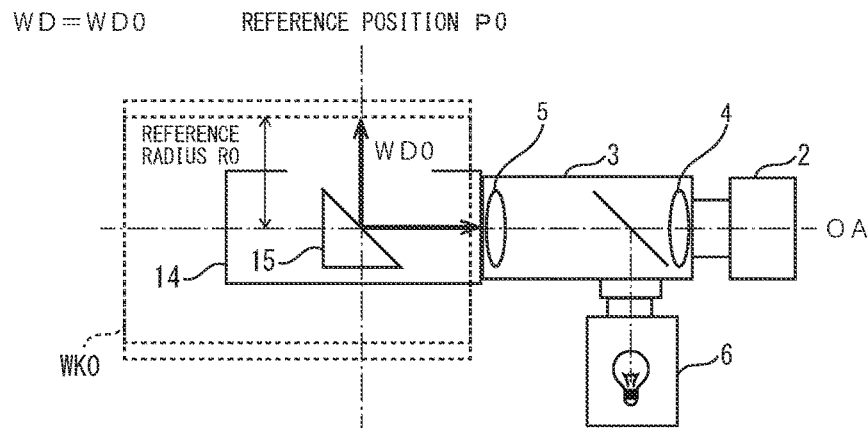
FIGS. 4A to 4C are supplementary diagrams illustrating a linear motion control method executed by a linear motion control unit in FIG. 2.

Positional control of the mirror 15 by the linear motion control unit 27 will now be described. As illustrated in FIG. 4A, when the mirror 15 is typically located at a center position (referred to as a reference position) P0 of a movable range and the distance on the optical axis OA from the front of the objective lens 5 to the inner surface of the cylindrical member WK0 through the mirror 15 (working distance WD) is matched with the reference working distance WD0, an internal radius of the cylindrical member WK0 at that time is defined as a reference radius R0.

Figure 4B:
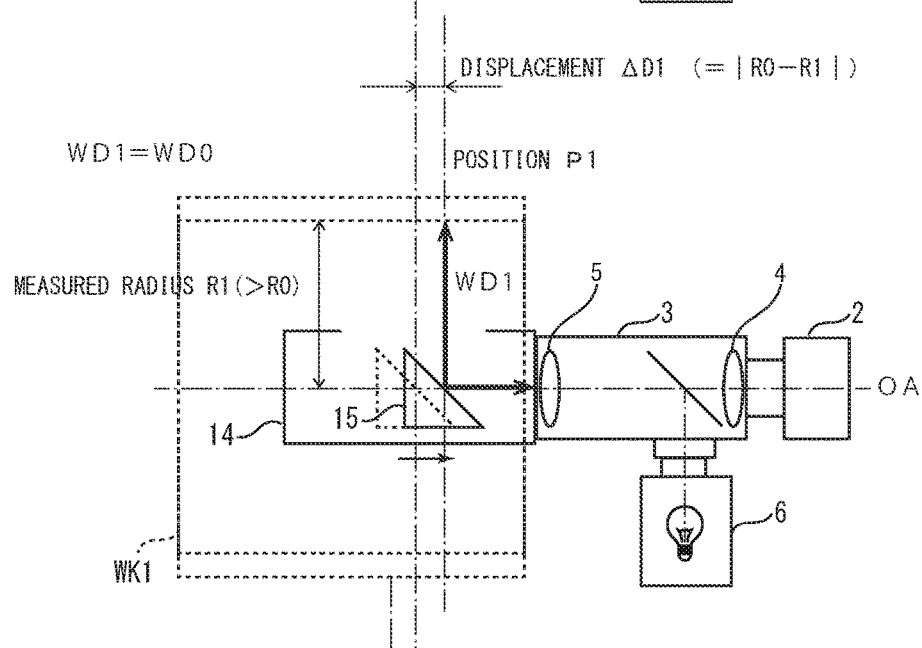

As illustrated in FIG. 4B, the linear motion control unit 27 controls the linear motion drive unit 25 to move the mirror 15 according to the distance R1 between the optical axis OA and the inner surface of the cylindrical member WK1 calculated by the sensor control unit 26 based on a detected signal of the distance sensor 17, or any distance from which the distance R1 is derivable. The direction of the movement is determined according to a result of comparison between the distance R0 and the distance R1. When the distance R1 is longer than the distance R0, the mirror 15 is moved in a direction in which it is brought closer to the lens-barrel 3 from the reference position P0. A distance (displacement) ΔD1 from the reference position P0 to a position P1 after movement is set to an absolute value |R0−R1| of a difference between the distance R0 and the distance R1. In this way, a working distance WD1 on the optical axis OA from the front of the objective lens 5 to the inner surface of the cylindrical member WK1 through the mirror 15 can be matched with the reference working distance WD.

Figure 4C:
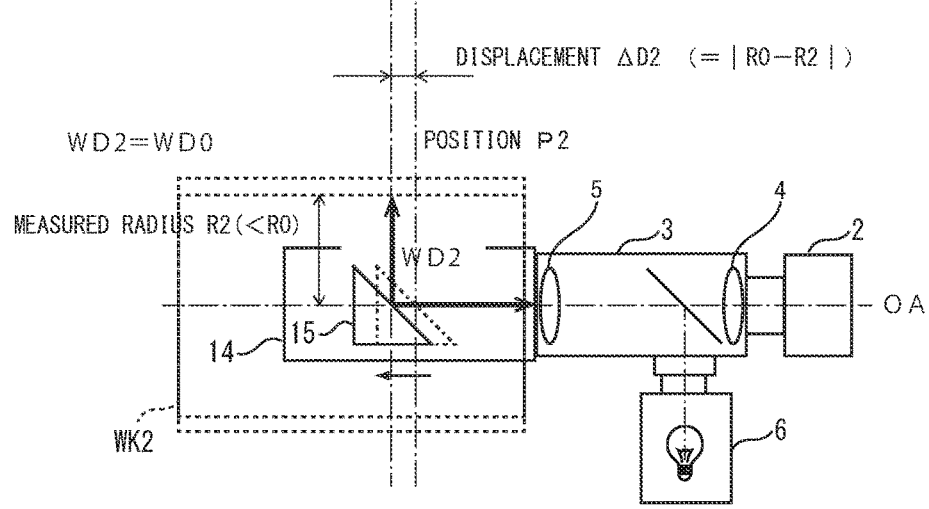

Similarly, when a cylindrical member WK2 that has an internal diameter shorter than that of the cylindrical member WK1 is to be inspected, as illustrated in FIG. 4C, the mirror 15 is moved in a direction in which it is moved away from the lens-barrel 3 beyond the reference position P0 as a distance R2 is shorter than the distance R0. A distance (displacement) ΔD2 from the reference position P0 to a position P2 after movement is set to an absolute value |R0−R2| of a difference between the distance R0 and the distance R2. In this way, a working distance WD2 on the optical axis OA from the front of the objective lens 5 to the inner surface of the cylindrical member WK1 through the mirror 15 can be matched with the reference working distance WD.

As described above, when various cylindrical members that have different internal diameters are to be inspected, by linearly moving the mirror 15 along the optical axis OA, the working distance WD on the optical axis OA from the front of the objective lens 5 to the inner surface of the cylindrical member WK through the mirror 15 can be adjusted to a predetermined distance, in particular the reference working distance WD0. Accordingly, the inner surface image inspection apparatus according to the embodiment can flexibly deal with various cylindrical members WK that have different internal diameters, and makes it possible to accurately inspect surface properties of the inner surface of the cylindrical member WK, while eliminating out of focus.

Now, there may be a situation where an attachment error may occur when the inner surface image inspection apparatus 1 is attached to the mount plate 56, and as a result, the optical axis OA of the inner surface image inspection apparatus 1 is not matched with the center line of rotation of the revolute joint unit J6. When the inner surface image inspection apparatus 1 is rotated in this state, the working distance WD on the optical axis OA from the front of the objective lens 5 to the inner surface of the cylindrical member WK may vary depending on the angle of rotation. In the embodiment, the distance between the optical axis OA and the inner surface of the cylindrical member WK1 can be repeatedly measured by the distance sensor 17. Accordingly, the mirror 15 can be dynamically moved following variation in the measured distance as the inner surface image inspection apparatus 1 is rotated, so that the working distance WD can be adjusted to the reference working distance WD0 over the entire circumference.

Further, even when the inner surface to be inspected is not completely round and is elliptical or even has irregularities to some extent, the mirror 15 can, as in the case above, be dynamically moved following variation in the distance between the optical axis OA and the inner surface of the cylindrical member WK1 measured by the distance sensor 17 as the inner surface image inspection apparatus 1 is rotated, so that the working distance WD can be matched with the reference working distance WD0 over the entire circumference.

Although description has been made above as to a configuration equipped with the distance sensor 17, a configuration without any distance sensor 17 may be used. A user can move the mirror 15 to any position through the linear motion control unit 27. When the user typically inputs a design internal diameter to the linear motion control unit 27, the mirror 15 can be moved to a position in which the working distance WD is matched with the reference working distance WD0.

Although description has been made above as to the mirror 15 as being electrically driven, the mirror 15 may be configured to be manually moved.

Figure 5:
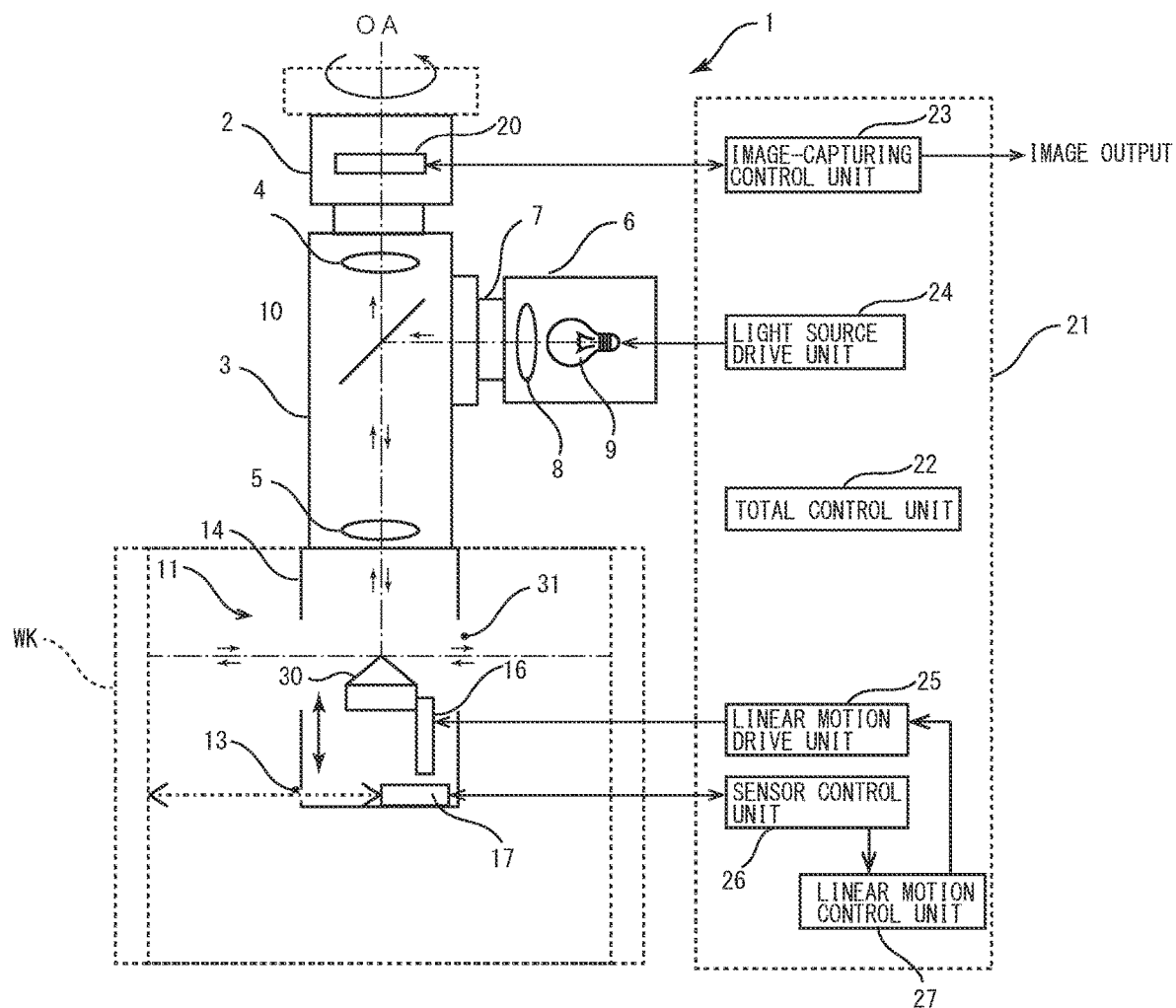
FIG. 5 illustrates another exemplary configuration of the inner surface image inspection apparatus in FIG. 1.

Alternatively, as illustrated in FIG. 5, the mirror 15 may be replaced with a cone mirror 30 of a conical shape with a vertex angle of 90°. As a matter of course, the cone mirror 30 is disposed in such a manner that a center line thereof coincides with the optical axis OA. The circular inspection window 12 in the side surface of the insert unit 11 is also replaced with a slit-like inspection window 31 over the entire circumference. An image of the entire inner surface can be captured in one shot without rotating the inner surface image inspection apparatus 1.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An inner surface image inspection apparatus for inspecting an inner surface of a hole of an inspection object, comprising:
    an image-capturing unit;
    a lens-barrel attached in front of the image-capturing unit, the lens-barrel containing an optical system;
    a light source unit attachable to and removable from the lens-barrel;
    a beam splitter that reflects an illumination light from the light source unit in a direction parallel to an optical axis of the optical system;
    an insert unit of a cylindrical shape attached to a leading end of the lens-barrel, the insert unit adapted to be inserted into the hole of the inspection object;
    a mirror disposed in the insert unit in such a manner that a reflecting surface of the mirror is inclined relative to the optical axis of the optical system; and
    a linear motion mechanism configured to move the mirror in parallel to the optical axis.

2. The inner surface image inspection apparatus according to claim 1, further comprising a linear motion control unit configured to control the linear motion mechanism to move the mirror in such a manner that a distance from a lens front of the optical system to the inner surface of the hole of the inspection object is constant regardless of an internal diameter of the hole of the inspection object.

3. The inner surface image inspection apparatus according to claim 2, wherein the distance is matched with a working distance of the optical system.

4. The inner surface image inspection apparatus according to claim 2, further comprising a distance sensor for measuring a distance from the optical axis of the optical system to the inner surface of the hole of the inspection object, or any distance from which the distance from the optical axis of the optical system to the inner surface of the hole of the inspection object is derivable.

5. The inner surface image inspection apparatus according to claim 4, wherein the linear motion control unit dynamically moves the mirror following variation in the distance from the optical axis of the optical system to the inner surface of the hole of the inspection object.

6. The inner surface image inspection apparatus according to claim 1, wherein the light source unit includes a telecentric lens.

7. The inner surface image inspection apparatus according to claim 1, wherein the optical system includes a telecentric lens.

8. The inner surface image inspection apparatus according to claim 1, wherein the mirror is a right-angle prism mirror, or a planar mirror attached at an inclination of 45° relative to the optical axis.

9. The inner surface image inspection apparatus according to claim 1, wherein the mirror is a cone mirror.

* * * * *